Sept. 13, 1932.  J. F. O'CONNOR  1,877,027
HAND BRAKE
Filed March 31, 1930
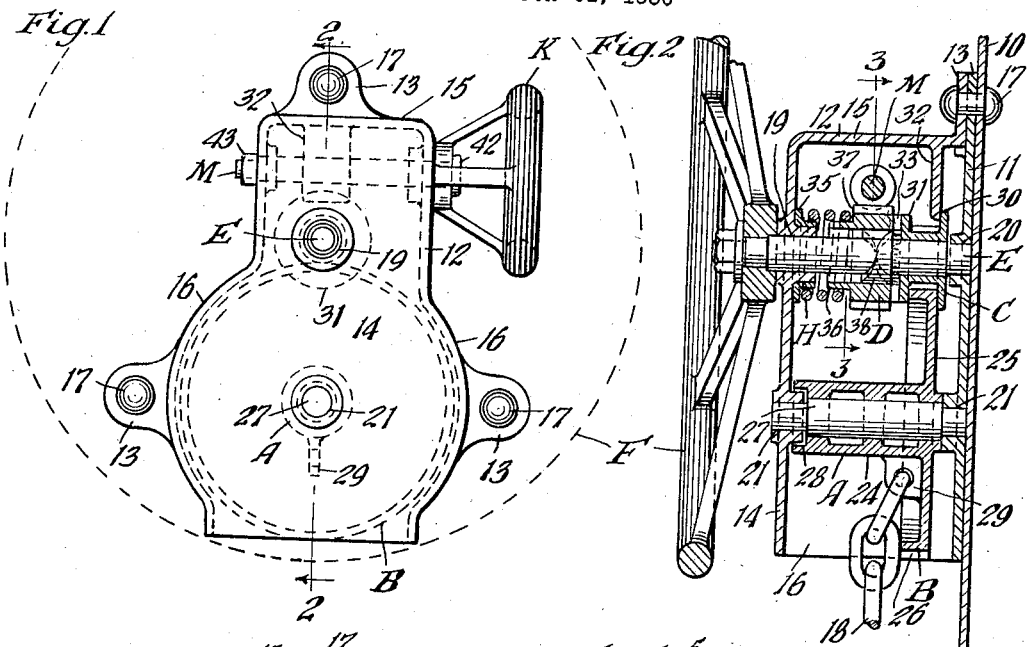
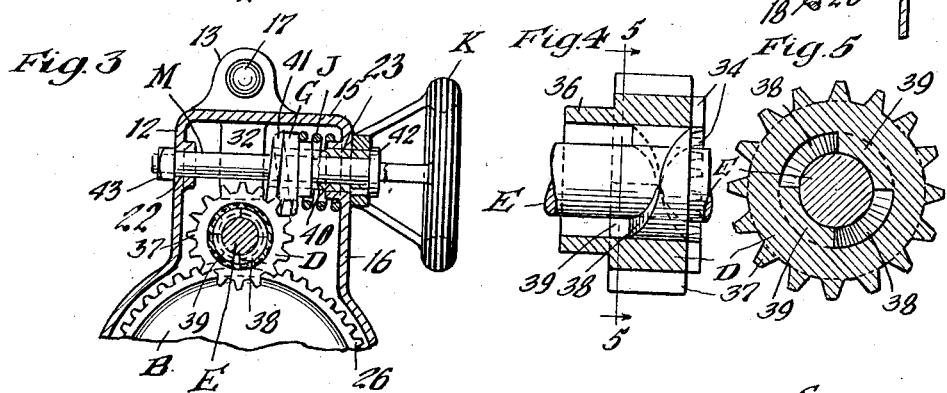
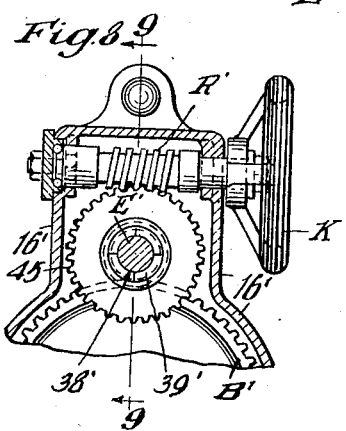
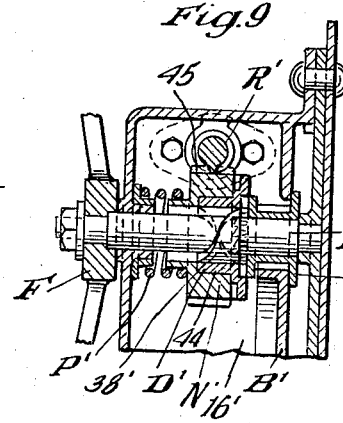
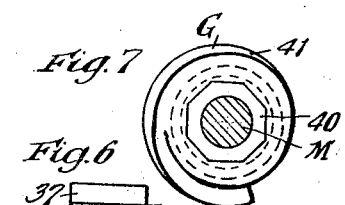
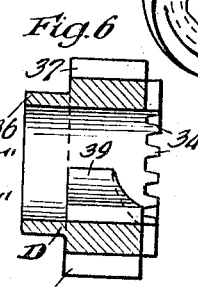
Witness
Wm. Geiger
Inventor
John F. O'Connor
By Joseph Harris
His Atty.

Patented Sept. 13, 1932

1,877,027

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

HAND BRAKE

Application filed March 31, 1930. Serial No. 440,258.

This invention relates to impovements in hand brakes, of the power multiplying type.

One object of the invention is to provide a simple and efficient hand brake mechanism, especially adapted for railway cars, so designed that the brakeman may apply the brakes by manipulation of a single hand wheel only, rotation of the hand wheel in one direction effecting application of the brakes and rotation thereof in a reverse direction effecting complete release of the same with free running of the tightening element thereby protecting the brakeman from injury by eliminating spinning of the hand wheel while the brake chain is unwinding from the drum.

A further object of the invention is to provide in connection with a brake mechanism, of the character referred to in the preceding paragraph, auxiliary means for easing off of the brakes.

Another object of the invention is to provide a hand brake mechanism of the character indicated, including a rotary chain winding means, a rotary operating means adapted to be engaged and disengaged from said winding means, a locking ratchet member cooperating with the operating means to hold the same against rotation in a direction corresponding to the direction of rotation thereof while the chain is being wound on the tightening means to tighten the brakes, and permitting movement thereof in a chain winding direction, an actuating element for rotating said operating means, and cooperating cam means on said operating means and actuating element, actuated by rotation of the latter in reverse directions for moving the operating means into operating engagement with the chain winding means to effect tightening of the brakes and disengaging the same therefrom to permit free running of the chain winding drum and complete release of the bakes.

A still further object of the invention is to provide in a mechanism as specified in the preceding paragraph, auxiliary means for actuating the chain winding means through rotation of the ratchet member to effect easing off of the brakes, which auxiliary means includes driving gearing of which the ratchet member forms a part.

Other objects of the invention will more clearly appear from the description and claims hereinafter following.

In the drawing, forming a part of this specification, Figure 1 is a front elevational view of my improved hand brake mechanism, illustrating the same as applied to the end wall of a railway car, the operating hand wheel being illustrated in dotted lines. Figure 2 is a vertical, sectional view of the hand brake mechanism illustrated in Figure 1 and corresponding substantially to the line 2—2 of said figure. Figure 3 is a sectional view corresponding substantially to the line 3—3 of Figure 2, showing that portion of the brake mechanism located in the upper part of the enclosing housing. Figure 4 is an enlarged, sectional view corresponding substantially to the sectional view illustrated in Figure 2, showing a portion of the operating shaft and co-operating clutch member in driving relation. Figure 5 is a transverse, sectional view corresponding substantially to the line 5—5 of Figure 4. Figure 6 is a sectional view similar to Figure 4, with the operating shaft and cam member thereof omitted. Figure 7 is a transverse, sectional view through the supporting shaft for the ratchet member, showing the ratchet member in end elevation and looking from the left in Figure 3. Figure 8 is a sectional view similar to Figure 3, illustrating another embodiment of the invention. And Figure 9 is a sectional view corresponding substantially to the line 9—9 of Figure 8.

Referring first to the embodiment of the invention illustrated in Figures 1 to 7 inclusive, the same is illustrated as mounted on the vertical end wall 10 of a railway car, and enclosed within a two part housing comprising a back plate 11 and a cover member 12. The back plate 11 is of flat form and of the outline shown in Figure 1 and has securing lugs 13—13 thereon, by means of which the same is fastened to the end wall 10 of the car. As shown in Figure 1, the securing lugs 13 are three in number, one being disposed at the upper end of the plate and the remaining two being arranged on opposite sides of the plate near the bottom end of the same. The cover member 12 of the housing is of substantially the same outline as the back plate 11 and has a substantially vertically disposed front wall 14 spaced from the plate 11, a horizontal top wall 15 and spaced side walls 16—16 which correspond in shape to the outer side edges of the back plate 11. At the inner edges, the top wall 15 and the side walls 16—16 are provided with laterally projecting lugs 13—13 which correspond to and register with the lugs 13—13 on the back plate 11. The two sections 11 and 12 of the housing are secured together by rivets 17—17, which extend through the lugs 13—13 thereof and also through the end wall 10 of the car, thereby in addition to securing the parts of the housing together, serving to fix the housing to said end wall. As most clearly shown in Figure 2, the housing is open at the bottom so as to accommodate the brake chain 18 for movement. The brake chain 18, as will be understood, is connected with the brake mechanism proper of the railway car, not shown. The front wall 14 and the back plate 11 of the housing are provided with alined bearing openings 19 and 20 respectively near the top end thereof, each of these openings being reinforced by annular flanges surrounding the same. Below the alined openings 19 and 20, the front wall 14 and the back plate 11 are provided with additional alined bearing openings 21—21 which are also reinforced by annular flange members surrounding said openings. The side walls 16—16, adjacent the upper end of the housing, have a pair of alined bearing openings 22 and 23 therein, the opening 23, which is located in the right-hand wall 16, as viewed in Figure 3, being of larger diameter than the opening 22 of the other wall. Both of these openings are also suitably reinforced by annular flange members surrounding the same.

My improved hand brake mechanism proper as illustrated in Figures 1 to 7 inclusive comprises broadly a chain winding drum A; a drive gear B fixed to the drum; a pinion C; a sliding clutch member D cooperating with the pinion; a drive shaft E; a hand wheel F; a rotary combined ratchet and worm member G; a clutch spring H; a ratchet spring J; an auxiliary hand wheel K, and a supporting shaft M.

The chain winding drum comprises a cylindrical hub-like portion 24 having a radially projecting disc-like flange 25 at the inner end thereof, the flange 25 forming a portion of the gear member B. At the periphery, the flange member 25 is provided with a right angular, inwardly projecting annular portion having gear teeth 26—26 formed thereon. The drum A is rotatably supported on a shaft member 27 having its opposite ends reduced and mounted in the openings 21—21 of the front and rear walls of the housing. At the outer end, the hub portion of the drum A is interiorly recessed, as indicated at 28, so as to accommodate the annular flange surrounding the corresponding opening 21 in the front wall 14 of the housing. At the inner end, the hub of the drum A has bearing engagement with the outer edge face of the annular flange member surrounding the opening 21 of the back plate 11, thereby preventing endwise displacement of the chain winding drum. Adjacent the flange 25, the hub member of the drum is provided with a securing lug 29 to which the inner end link of the brake chain 18 is secured.

The chain winding drum A is driven by the pinion C which meshes with the gear member B, the pinion being supported on the operating drive shaft E, which has its opposite ends journaled in the openings 19 and 20 of the front and rear walls of the housing. As clearly illustrated in Figure 2, the inner end portion of the shaft E is reduced in diameter and fits the opening 20 of the back plate 11 of the housing. The front end of the shaft E projects through the bearing opening 19 of the front wall 14 of the housing and has the hand wheel F fixed to the outer end thereof, the hub of the hand wheel being provided with an opening adapted to accommodate the outer end portion of the shaft E, which is also of reduced diameter, as clearly illustrated in Figure 2. The pinion C is freely rotatable on the shaft E and has inner and outer annular spaced flange members 30 and 31 which embrace the adjacent peripheral portion of the gear B, the teeth of the pinion being disposed between these flanges. As most clearly shown in Figure 2, the top wall 15 of the housing is provided with a depending finger-like portion 32, which engages the front face of the flange 30 of the pinion, thereby holding the pinion in proper position, the rear face of the pinion cooperating with the annular flange surrounding the opening 20 of the back plate 11 of the housing to prevent movement of the pinion to the right, as viewed in Figure 2. The flange 31 of the pinion C is provided with a plurality of clutch teeth 33—33 for a purpose hereinafter pointed out.

The clutch member D is in the form of a collar and is mounted for free rotation on the shaft E. At the inner end, the clutch member is provided with clutch teeth 34—34, which cooperate with the teeth 33—33 of the pinion C. The clutch member D is yieldingly held in clutching engagement with the pinion C by means of the spring H, which is interposed between said clutch member and the front wall 14 of the housing. As illustrated in Figure 2, the front end of the spring H bears on an annular flange of a thimble member 35, which surrounds the flange of the opening 19 and extends into the coil of the spring. At the inner end, the spring bears directly on the clutch member D, which has a reduced projecting annular portion 36 extending into the coils of the spring. The clutch member D is also provided with an annular series of gear teeth 37—37 which cooperate with the combined ratchet and worm member G. Within the clutch member D the shaft E is provided with a pair of opposed cam lugs 38—38, which are adapted to cooperate with complementary cam lugs 39—39 formed interiorly of the clutch member D. The inclination of the cooperating cam lugs 38 and 39 of the shaft E and the clutch member D is such that when the operating shaft E is rotated in a contra-clockwise direction, as viewed in Figure 1, the same will force the clutch members apart against the resistance of the spring H. When the operating shaft E is rotated in a clockwise direction, the cooperating cam lugs 38 and 39 permit re-engagement of the clutch members, the member D being forced toward the member C by the spring H.

The supporting shaft M carries the combined ratchet and worm member G, which is freely rotatable thereon. The worm member G is directly mounted on a sleeve 40, which is rotatable on the supporting shaft M. The inner end of the sleeve 40 is of octagonal, exterior, transverse cross section and fits within an opening of similar cross section in the combined ratchet and worm member G, whereby the member G and the sleeve 40 are rotatable in unison and the combined ratchet and worm member G is slidable lengthwise of the sleeve. The outer portion of the sleeve 40 is of cylindrical form, being journaled in the opening 23, and the auxiliary hand wheel K is fixed to the outer end thereof, whereby rotation of the hand wheel K effects rotation of the sleeve and the combined ratchet and worm member G. The worm member G has a peripheral thread 41 of worm formation, the thread being of such a cross section as to provide, in effect, ratchet teeth which cooperate with the teeth 37—37 of the clutch member D. The ratchet spring J surrounds the shaft M and sleeve 40 and is interposed between the combined ratchet and worm member G and the side wall 16 at the right-hand side of the casing, as viewed in Figure 3. As viewed in Figure 3, the combined ratchet and worm member G has the hub portion thereof reduced at the righthand end and fitting within the corresponding end of the coil spring J, the opposite end of the spring surrounding and fitting the annular flange which surrounds the opening 23 of the housing. As shown, the supporting shaft M has a head 42 at one end thereof engaging the outer end of the sleeve 40 and the hub portion of the hand wheel K, the opposite end of the shaft being provided with a securing nut 43 bearing on the corresponding side wall 16 of the housing. The hub portion of the combined ratchet and worm member G is normally spaced from the inner end of the annular flange surrounding the opening 23 so as to permit a certain amount of movement of the member G to allow for ratcheting action. As will be evident, when the hand wheel K is operated in a clockwise direction, the combined ratchet and worm member G through its threaded engagement with the gear teeth of the member D permits of rotation of the latter together with the pinion C and the chain winding drum A in chain unwinding direction, whereby the brake may be eased off under the complete control of the brakeman. Although as herein shown, the brakes are eased off by clockwise rotation of the hand wheel K, if found desirable the construction may be altered to provide for rotation of the hand wheel K in contra-clockwise direction while easing off the brakes by providing the worm member G with left hand instead of right hand threads.

In the operation of my improved hand brake mechanism, when it is desired to apply the brakes, the hand wheel F is rotated in a clockwise direction, as viewed in Figures 1 and 2, thereby effecting rotation of the shaft E in a similar direction. Due to the formation of the co-operating cam lugs 38 and 39 on the shaft E and the clutch member D, the latter will be held in operative engagement with the clutch teeth of the pinion C by the action of the clutch spring H during the described rotation of the hand wheel F. As clearly shown in Figure 5, the advance vertical faces of the lugs 38—38 of the shaft E engage the vertical rear faces of the lugs 39—39 of the clutch member D, thereby positively effecting rotation of the latter when the same is in clutching engagement with the pinion C. Rotation of the pinion C effects, through the cooperating gear B, rotation of the winding drum A in a contra-clockwise direction, thereby winding the brake chain 18 on the drum and tightening the brakes. During this operation, the combined ratchet and worm member G will hold the clutch member D against rotation in a contra-clockwise direction while permitting rotation thereof in a clockwise direction, due to the ratcheting action hereinbefore described.

In case it is found desirable to ease off the brakes, the hand wheel K is rotated in a clockwise direction, as viewed in Figures 1 and 3, with resultant rotation of the combined ratchet and worm member G, clutch member D, pinion C, which is in clutching relation with the member D, and chain winding drum A in unwinding direction.

When it is desired to release the brakes, the operator turns the hand wheel F in a contra-clockwise direction, thereby effecting relative rotation between the shaft E and the clutch member D, the latter being held against rotation by engagement with the combined ratchet and worm member G. Due to the relative displacement of the cam lugs 38 and 39 of the shaft E and the clutch member D, during this action, the clutch member D is forced away from the pinion C, thereby disengaging the clutch teeth. Upon complete disengagement of the clutch members, the pinion C is free to rotate on the shaft E, thereby permitting free running of the chain winding drum A and complete release of the brakes. As will be evident, during this releasing action, the hand wheel F remains inactive or stationary, thereby safeguarding the brakeman against injury.

Referring next to the embodiment of the invention illustrated in Figures 8 and 9, the same comprises a housing substantially the same as that hereinbefore described in connection with the invention illustrated in Figures 1 to 7, inclusive, the housing being secured to the end wall of the car and enclosing the brake mechanism proper. The brake mechanism proper, which is mounted in the housing, comprises a chain winding drum, not shown, which is similar to the drum A hereinbefore described, and is mounted for rotation on a supporting shaft and carries an integral gear member B' in all respects similar to the gear member B, hereinbefore described and meshing with a pinion C', similar to the pinion C. The pinion C' is supported on an operating drive shaft E', which carries a sliding clutch member D', the clutch member D' and the pinion C' having cooperating clutch teeth. The operating shaft E' carries the operating hand wheel F' at the outer end thereof and is provided with cam lugs 38'—38' similar to the cam lugs 38 hereinbefore described and cooperating with cam lugs 39'—39' on the clutch member D' and similar to the lugs 39—39 and operating in a similar manner. As clearly illustrated in Figure 9, the clutch member D' is provided with a reduced portion of annular cross section, as indicated at 44, on which a rotary ratchet member N', in the form of a collar, is mounted. The ratchet member N' and the clutch member D' have cooperating ratchet teeth, permitting relative rotation of these parts when the operating shaft E' is rotated in a clockwise direction to tighten the brakes, and holding the same against relative rotation to prevent retrograde rotation of the chain winding drum. The ratchet member N' is yieldingly held in engagement with the clutch teeth of the pinion C' by means of a combined ratchet and clutch spring P', which is interposed between the ratchet member N' and the outer wall of the housing. As will be evident, the ratchet member N', which is urged in a righthand direction by the spring P', as viewed in Figure 9, also, through engagement with the clutch member D', urges the latter to the right, thereby yieldingly maintaining the clutching engagement thereof with the pinion C'.

In order to provide means for easing off the brakes, a worm member R' is provided which cooperates with gear teeth 45—45 provided on the periphery of the ratchet member N'. The worm member R' is formed on a shaft having its opposite ends journaled in the spaced side walls 16'—16' of the housing, the righthand end of the shaft having an operating hand wheel K' secured thereto so as to effect rotation of the worm R'.

In tightening the brakes, the hand wheel F' is rotated in a clockwise direction, as viewed in Figures 8 and 9, thereby effecting rotation of the clutch member D', which cooperates with the pinion C', and tightening the brakes. During this action, retrograde rotation of the chain winding drum is prevented by the ratchet member N', which is yieldingly held in engagement with the ratchet teeth of the clutch member D', rotation of the ratchet member N' being prevented by engagement with the worm threads of the member R'. In case it is found desirable to ease off the brakes, the hand wheel K' is rotated in a clockwise direction, thereby rotating the ratchet member N' which through the ratchet teeth thereof drives the clutch member D', which permits rotation of the pinion C' and the chain winding drum in an unwinding direction.

To effect release of the brakes, the operator turns the hand wheel F' in a contraclockwise direction, thereby effecting relative movement of the cam lugs 38' and 39' and forcing the clutch member D' out of engagement with the clutch teeth of the pinion C'. The pinion C' is thus freed for rotation on the shaft E', thereby permitting free running of the chain winding drum and complete release of the brakes.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain winding member; of a driving element connected thereto; a rotary manually actuated operating means rotatable in reverse directions; a ratchet member normally operative for preventing rotation of the winding member in unwinding direction; means for connecting said operating means with and disconnecting the same from said driving element when said operating means is rotated in directions corresponding to the chain winding and unwinding directions respectively, said operating means when engaged with said driving member and rotated in chain winding direction effecting tightening of the brakes, said operating means when rotated in a reverse direction being disconnected from said driving means and thereby rendering said ratching member ineffective and permitting free running of the chain winding member and complete release of the brakes; and auxiliary means for actuating said chain winding member to ease off the brakes.

2. In a hand brake mechanism, the combination with a rotary chain tightening member; of a rotary driving member connected thereto; rotary operating means, including a manually actuated rotary element and a driving element connected thereto; cooperating means on said rotary element and the driving element for effecting engagement of said driving element with said driving member when the manually actuated rotary element is rotated in a direction corresponding to the direction of rotation thereof when the chain is being tightened, and effecting disengagement of said driving element and driving member when the manually actuated rotary element is rotated in a reverse direction, thereby effecting complete release of the brakes; and auxiliary means for easing off the brakes and also preventing retrograde rotation of the winding drum while the brakes are being tightened.

3. In a hand brake mechanism, the combination with a rotary chain winding member; of a driving element connected thereto; rotary operating means for said driving element; actuating means for said operating means, said actuating means being rotatable in reverse directions; a ratchet member cooperating with said operating means and preventing rotation thereof in a direction reverse to the direction of rotation thereof during winding of the chain on the drum; means operated by said actuating means for effecting engagement of said operating means with said driving element and disengagement therefrom when said actuating means is rotated respectively in chain winding direction and in a direction reverse thereto, said operating means when engaged with said driving member and rotated in chain winding direction by said actuating means effecting tightening of the brakes, and when disengaged therefrom permitting free running of the chain winding member to release the brakes; and auxiliary means comprising cooperating gear means including said ratchet means for easing off the brakes.

4. In a hand brake mechanism, the combination with a rotary chain winding member; of a driving element connected thereto; a rotary manually actuated operating means rotatable in reverse directions; means for normally preventing rotation of the winding member in unwinding direction, said means for preventing rotation including cooperating worm and gear elements normally in meshing engagement and adapted to be manually actuated to effect easing off of the brakes, said gear being connected to the driving element, and said worm being yieldable with respect to said gear to provide for ratcheting action in the brake tightening operation; means for effecting connection and disconnection of said operating and driving element when said operating means is rotated in directions corresponding to the chain winding and unwinding directions respectively, said operating means when operatively connected with said driving member and rotated in chain winding direction effecting tightening of the brakes, and said operating means when disengaged through partial rotation in a reverse direction permitting free running of the chain winding member and complete release of the brakes.

5. In a hand brake mechanism, the combination with a rotary chain tightening element; of a manually actuated operating member; means actuated by said operating member for operatively connecting said manually actuated member and the chain tightening element when said member is rotated in a direction to effect winding of the chain on said element, and completely disengaging said member and element through rotation of said member in a reverse direction and permitting rotation of said tightening element relative thereto in unwinding direction; a ratchet member for preventing retrograde rotation of the chain winding element; and auxiliary means in which said ratchet member is included for effecting easing off of the brakes.

6. In a hand brake mechanism, the combination with a rotary chain tightening element; of a manually actuated operating member; releasable means actuated by said operating member for operatively connecting said manually actuated member and the chain tightening element when said member is rotated in a direction to effect winding of the chain on said element, and completely disengaging said member and element through rotation of said member in a reverse direction while permitting free rotation of said tightening element relative thereto in unwinding direction; a ratchet member for preventing retrograde rotation of the chain winding element; and auxiliary means for actuating said ratchet member for effecting rotation of said connecting means to effect easing off of the brakes.

7. In a hand brake mechanism, the combination with a rotary chain tightening element; of a manually actuated operating member; means for operatively connecting said manually actuated member and the chain tightening element when said member rotated in a direction to effect winding of the chain on said element, and disengaging said member and element when rotated in a reverse direction, said means including cooperating clutch members connected to said operating member and tightening element, respectively, and cooperating cam members on one of said clutch members and the manually actuated member respectively; and a locking member for preventing rotation of one of said clutch members in a direction corresponding to the direction of rotation thereof when said tightening element is rotated in unwinding direction.

8. In a hand brake mechanism, the combination with a rotary chain tightening element; of a manually actuated operating member; means for operatively connecting said manually actuated member and the chain tightening element when said member is rotated in a direction to effect winding of the chain on said element, and disengaging said member and element when rotated in a reverse direction, said means including cooperating clutch members connected to said operating member and tightening element respectively, the connection between said operating member and corresponding clutch member including means for advancing the clutch members toward each other when said operating member is rotated in a chain tightening direction and disengaging said clutch members when said operating member is rotated in a reverse direction; and auxiliary means including a worm element for rotating one of said clutch members to ease off the brakes, said worm element having ratcheting engagement with the cooperating clutch member for preventing rotation of the clutch members in a direction reverse to the direction of rotation thereof when the chain is being tightened.

9. In a hand brake mechanism, the combination with a rotary tightening element; of a rotary driving member connected thereto; a manually actuated rotary operating member coaxial with said driving member; cooperating clutch members on said operating member and driving member; cooperating means on one of said clutch members and driving member for effecting operative engagement of said clutch members when said operating member is rotated in a chain tightening direction, and disengaging said clutch members when rotated in a reverse direction; a worm means cooperating with one of said clutch members for rotating the same; and spring means for yieldingly holding said worm means engaged with said clutch member to provide ratcheting mechanism for preventing rotation of the clutch members in a direction reverse to the direction of rotation thereof when the chain is being tightened by the rotary operating member.

10. In a hand brake mechanism, the combination with a rotary tightening element; of a driving member connected thereto; a rotary operating element; and cooperating clutch means on said operating element and driving member, respectively, having interengaging clutch teeth operative to drive said element in reverse directions, said operating element and one of said clutch means having cooperating cam elements thereon for effecting relative separation of the clutch means lengthwise of the axis of rotation of the operating element; and means for yieldingly forcing said clutch elements toward each other.

11. In a hand brake mechanism, the combination with a rotary tightening element; of a driving member connected thereto; a rotary operating element; cooperating clutch means on said operating element and driving member, one of said clutch means having camming engagement with the operating element, said last named clutch means having teeth thereon; and a spring pressed threaded ratchet member cooperating with the teeth of the clutch means to permit ratcheting action when said operating member is actuated, the threads of said ratchet member and the teeth of said clutch member being of worm formation and said ratchet member being rotatable to effect rotation of the clutch member in a direction to ease off the brakes.

12. In a hand brake mechanism, the combination with a rotary chain winding drum; of a driving gear connected thereto; a pinion cooperating with said gear; a rotary operating shaft rotatable in one direction to tighten the brakes and also rotatable in a reverse direction; cooperating clutch means for connecting said drive shaft and pinion, said clutch means including a member movable on said shaft; means for yieldingly forcing said movable clutch member toward the other clutch member; cooperating means on said movable clutch member and operating shaft for forcing said clutch members apart when the shaft is rotated in said reverse direction, said movable clutch member having gear teeth; and a rotatable worm member engaging the teeth of said clutch member, said worm member being yieldable in one direction axially and held against movement in a reverse direction for preventing rotation of said movable clutch member in a direction corresponding to said reverse direction of rotation of said shaft.

13. In a hand brake mechanism, the combination with a rotary tightening element; of a rotary driving member connected thereto; a manually actuated rotary operating member coaxial with said driving member; cooperating clutch members on said operating member and driving member respectively; spring means cooperating with one of said clutch members for urging the same toward the other and forcing said members into clutching engagement; and cooperating cam means on said last named clutch member and operating member, respectively, for separating said clutch members when the operating member is rotated in a direction reverse to the direction of rotation thereof when tightening the brakes.

In witness that I claim the foregoing I have hereunto subscribed my name this 28th day of March, 1930.

JOHN F. O'CONNOR.